United States Patent
Hopper

[11] 3,891,246
[45] June 24, 1975

[54] FLUID LINE COUPLING
[75] Inventor: Richard A. Hopper, Florissant, Mo.
[73] Assignee: McDonnell Douglas Corporation, St. Louis, Mo.
[22] Filed: Dec. 3, 1973
[21] Appl. No.: 421,024

[52] U.S. Cl. ............ 285/110; 285/184; 285/334.4; 285/354; 285/DIG. 18
[51] Int. Cl. ............................................. F16l 17/00
[58] Field of Search ........ 285/332.1, 184, 321, 354, 285/387, 388, 261, 263, 110, 23, 24, 285/DIG. 18, 266, 334.4

[56] References Cited
UNITED STATES PATENTS

| | | | |
|---|---|---|---|
| 403,916 | 5/1889 | Collins | 285/261 X |
| 789,541 | 5/1905 | Hayes | 285/DIG. 18 |
| 885,256 | 4/1908 | Jones | 285/261 |
| 954,496 | 4/1910 | Barron | 285/261 X |
| 2,385,421 | 9/1945 | Monroe | 285/263 X |
| 3,243,209 | 3/1966 | Chertok | 285/332.1 X |
| 3,712,645 | 1/1973 | Herter | 285/261 X |

FOREIGN PATENTS OR APPLICATIONS

| | | | |
|---|---|---|---|
| 187,549 | 10/1956 | Austria | 285/261 |
| 1,060,203 | 6/1959 | Germany | 285/266 |
| 1,075,907 | 2/1960 | Germany | 285/263 |
| 1,178,972 | 5/1959 | France | 285/266 |
| 781,227 | 5/1935 | France | 285/266 |

Primary Examiner—Richard J. Scanlan, Jr.
Assistant Examiner—Moshe I. Cohen
Attorney, Agent, or Firm—Gravely, Lieder & Woodruff

[57] ABSTRACT

A fluid line coupling for allowing fluid lines to be coupled with provision for some misalignment or angular relationship to be accommodated without disrupting a secure seal or imposing stresses in the components of the coupling when the fluid lines are carrying pressurized fluids. The coupling seal embodies elements having mating concave and convex surfaces and other elements having sliding contact for substantially evenly distributing the forces developed when the coupling is tightened down in service.

11 Claims, 3 Drawing Figures

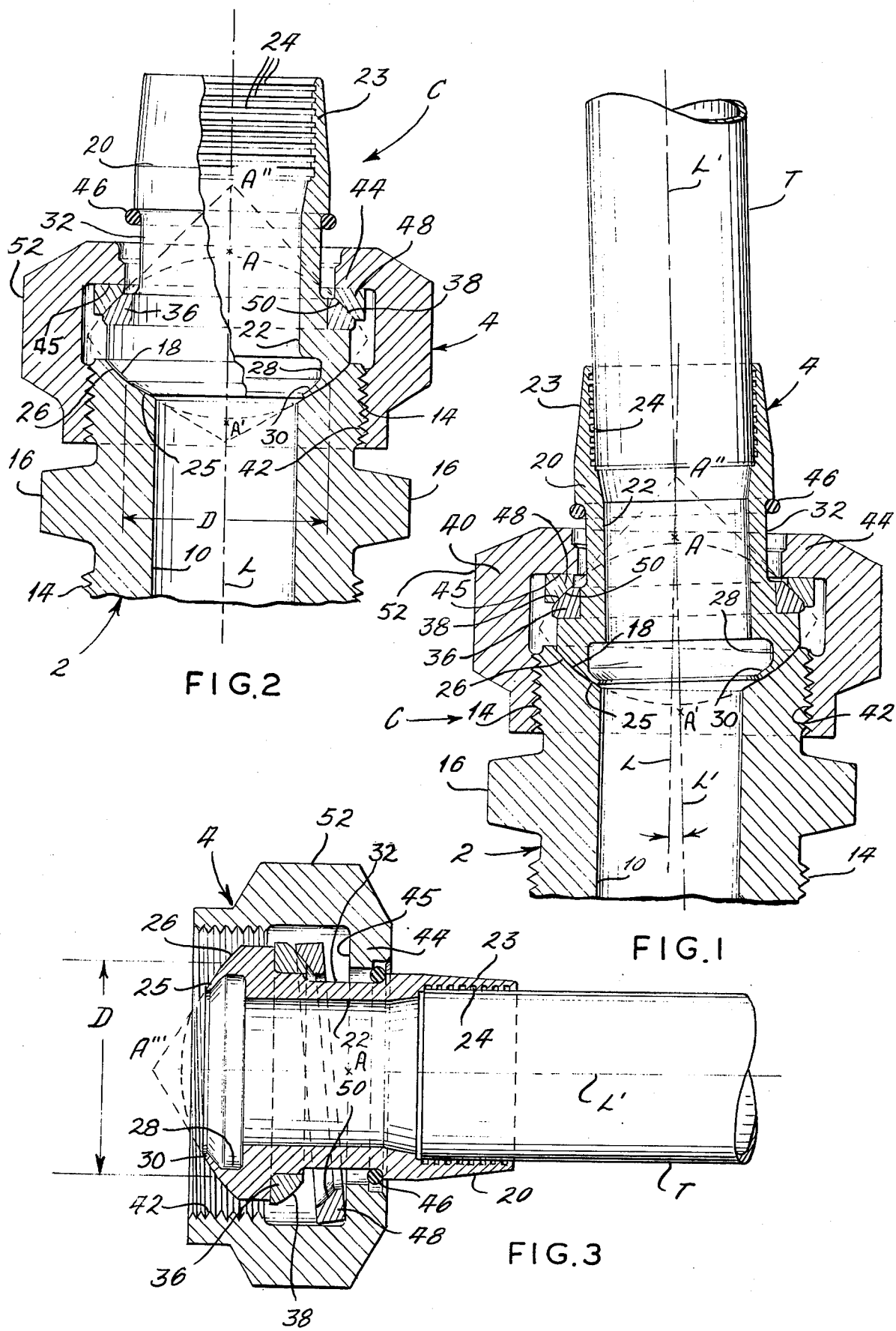

FLUID LINE COUPLING

BACKGROUND OF THE INVENTION

This invention relates in general to couplings for joining fluid conducting parts, and more particularly to a coupling that will accommodate angular or other misalignment conditions.

Heretofore, couplings have been developed for uniting fluid lines which do not perfectly align, but these couplings usually contain O-rings or other elastomeric seals and therefore cannot withstand high operating temperatures. Even moderate operating temperatures cause the elastomers to take on a permanent set, and as a result the seals leak. Moreover, elastomers are incompatible with many liquids and therefore cannot be used in lines for those liquids.

Couplings without elastomeric seals often acquire large locked in stresses during installation due to slight misalignment of the mating fittings which form the coupling, and these stresses reduce the fatigue life of such couplings as well as the tubes they unite.

SUMMARY OF THE INVENTION

One of the principal objects of the present invention is to provide a coupling capable of joining fluid lines without leaking, even when the fluid lines are not perfectly aligned. Another object is to provide a coupling of the type stated which can withstand high temperatures and is suitable for use with most liquids and gases, particularly those of a petroleum base. A further object is to provide a coupling of the type stated which can withstand vibrations and expansions and contractions resulting from temperature changes. An additional object is to provide a coupling of the type stated which can join angularly misaligned fluid lines without creating large locked-in stresses. These and other objects and advantages will become apparent hereinafter.

The present invention is embodied in a coupling having first and second tubular elements provided with mating convex and concave spherical end surfaces. The element having the convex end surface is provided with another convex surface which faces in the opposite direction. A slip ring is forced tightly against the other convex surface by securing means so that the complementary end surfaces are clamped tightly together. The invention also consists in the parts and in the arrangements and combinations of parts hereinafter described and claimed.

DESCRIPTION OF THE DRAWINGS

In the accompanying drawings which form part of the specification and wherein like numerals and letters refer to like parts wherever they occur.

FIG. 1 is a sectional view showing the coupling of the present invention with the male and female fittings thereof slightly misaligned;

FIG. 2 is a sectional view of the coupling showing the male and female fittings aligned; and FIG. 3 is a sectional view showing the female fitting detached from the male fitting.

DETAILED DESCRIPTION

Referring now to the drawings (FIG. 1), C designates a coupling for joining a metal tube T to another metal tube or to some appliance which receives a fluid, such as a valve, pump or manifold. The coupling C includes a male fitting 2 which is connected to the other tube or appliance and a female fitting 4 which is connected to the tube T.

The male fitting 2 (FIGS. 1 and 2) is an integral tubular element having a central bore 10 which extends completely through it and forms a fluid channel therein. Adjacent both its ends the fitting 20 has external threads 14 and intermediate the two threads 14 the fitting 2 is enlarged and provided with lands 16 capable of being received in a standard end wrench. One set of threads 14 is engaged by the female fitting 4, while the other set threads into a similar female fitting or into some other appliance (not shown).

At one end the male fitting 2 has a concave seating or end surface 18 through which the bore 10 opens, and this surface is spherical in configuration, that is, it is a portion of a sphere, the center A of which is along the axial extension of the centerline L for the bore 10. The end surface 18 should be ground or otherwise machined so that it is truly spherical and perfectly smooth. The radius of curvature for the surface 18 is substantially greater than the diameter of the bore 10.

The female fitting 4 (FIGS. 1 and 2) is composite in construction and includes a tubular element 20 having a bore 22, which extends completely through it and forms a fluid channel therein, and a tapered surface 23 at its outer end. The portion of the bore 22 surrounded by the tapered surface 23 has a series of axially spaced circumferential grooves 24. The tube T fits into this portion of the bore 22, and once inserted the tube T is swaged outwardly, causing the tube T to imbed in the grooves 24. This secures the tube T tightly in the bore 22.

The opposite end of the tubular element 20 is enlarged and has a composite end or seating surface composed of a tapered inner surface 25 and a convex outer seating surface 26 which encircles the inner surface 25 (FIG. 3). The convex outer surface 26 is spherical in that it is a portion of a sphere having its center coincident with the center A on the axial centerline L of the bore 22. The radius of the sphere is the same as that for the concave end surface 18 so that the surfaces 18 and 26 are complementary and have their centers A at the same location. The surface 26 is also ground or otherwise machined so that it is truly spherical and perfectly smooth. Behind the tapered inner surface 25 the enlarged end of the tubular element 20 is provided with an undercut 28 which opens into the bore 22 and forms a lip 30 on which the tapered surface 25 is disposed. The tapered surface 25 is frustoconical and tapered at an angle with respect to the axial centerline L' of the tubular element 20 such that the inner margin or edge of the lip 30 will upon initial contact with the concave end surface 18 at the end of the male fitting 2 leave a small gap between convex surface 26 and the concave surface 18. The tapered surface 25 intersects convex surface 26 at a diameter D which is slightly larger than the undercut 28 to insure that the lip 30 is not sheared off under load. The lip 30 which is formed by the surface 25 and the undercut 28 is rendered sufficiently flexible to deflect when the female fitting 4 and the male fitting 2 are assembled and nut 40 is torqued. The lip 30 will deflect until the convex surface 26 bears against the concave end surface 18 at the end of the male fitting 2 providing a seal between the lip 30 and the concave surface 18 and a seal between the convex surface 26 and the concave surface 18. The flexible lip 30 and the convex surface 26 will remain against the concave surface 18 even when the tubular element 20 does not align perfectly with the male fitting 2, that is, when the axial centerlines L and L' of the bores 10 and 22 in the male and female fittings 2 and 4, respectively are not coincident.

The tubular element 20 between its ends is reduced in diameter to provide an outwardly opening relief 32, and fitted snugly around the enlarged end of the tubular element 20 adjacent to the outwardly opening relief 32 is a bearing ring 36 having a beveled and spherical bearing surface 38 which faces generally opposite from the direction in which the convex surface 26 faces. The center A' of curvature for the surface 38 lies along the axial centerline L' for the tubular element 20.

Aside from the tubular element 20, the female fitting 4 also includes a nut 40 (FIGS. 1 and 2) which fits around the tubular element 20 and at one end has internal threads 42 which engage the external threads 14 of the male fitting 2 to enable the nut 40 to be screwed down over the female fitting 2. At its opposite end, the nut 40 has an inwardly directed flange 44 provided with a flat abutment face 45 disposed perpendicular to the axis of the nut 40, which is of course the centerline L of the male fitting 2. The nut 40 is retained on the tubular element 20 by a split ring retainer 46 which snaps into the outwardly opening relief 32 at the end thereof closest to the tapered surface 23. The retainer 46 represents an obstruction beyond which the flange 44 of the nut 40 will not pass, and when the flange 44 is against the retainer 46, the nut 40 still projects beyond the convex surface 26 and the lip 30 protecting the same (FIG. 3).

Captured between the bearing ring 36 and the flange 44 of the nut 40 is a slip ring 48 having a beveled bearing surface 50 which is frusto-conical in shape and presented toward the spherical bearing surface 38 of the bearing ring 36. The surface 50 is tapered at 45° with respect to the axial centerline L of the nut 40 and the apex A'' of the cone which is defined by that surface lies along the axial centerline L of the nut 40 and male fitting 2. The distance from the center of the tapered bearing surface 50 to the apex A'' is equal to radius of curvature for the spherical bearing surface 38. When the nut 40 is backed off, the slip ring 48 is loosely disposed and has a limited amount of free motion in the radial direction (FIG. 3). However, when the nut 40 is tightened down over the threads 14 of the male fitting 2, the flat abutment face 45 on the nut flange 44 bears against the back face of the slip ring 48 and forces the tapered bearing surface 50 thereof against the spherical surface 38 of the bearing ring 36. Since the slip ring 48 is initially loose in the nut 40 and its back face bears against the flat abutment surface 45, the ring 48 is free to locate itself in the radial direction relative to the nut 40, and the clamping force created by the nut 40 is evenly distributed over the bearing ring 36 (FIGS. 1 and 2). The external surface of the nut 40 has lands 52 so that the nut 40 may be gripped by a wrench and turned.

When the nut 40 is tightened down over the male fitting 2, its flange 44 urges the slip ring 48 against the bearing ring 36 on the tubular element 20 (FIGS. 1 and 2). This clamping force is transmitted through the rings 36 and 48, and causes the lip 30 to deflect and the convex end surface 26 and the frusto-conical surface 25 on the tubular element 20 to seat tightly against the concave end surface 18 on the male fitting 2, forming a fluid-tight seal therewith.

Inasmuch as the fluid seal between the male fitting 2 and the female fitting 4 is formed jointly by the lip 30 and the mating surfaces 18 and 26 which are of spherical configuration, the male fitting 2 need not be precisely aligned with the tubular element 20 of the female fitting 4 (FIG. 1). Also, the fact that the bearing surface 38 of the bearing ring 36 is spherical and the bearing surface 50 of the slip ring 48 is canted at 45° coupled with the fact that the ring 48 locates itself in the radial direction, sliding against the flat abutment surface 45 as it does, insures that the clamping force imposed by the nut 40 on the tubular element 20 is distributed evenly around the tubular element 20, even when that element is not perfectly aligned with male fitting 4, so that the seal around the lip 30 and along the spherical surfaces 18 and 26 remains secure in a condition of slight misalignment. Indeed, the tubular element 20 may be misaligned to an angle of as much as 3° or more with respect to the male fitting 2 without impairing the seal along the complementary spherical surfaces 18 and 26 (FIG. 1).

When the male and female fittings 2 and 4 are separated (FIG. 3), the nut 40 projects axially beyond the convex end surface 26 and the lip 30 of the tubular element 20, even when the flange 44 of the nut 40 is against the split ring retainer 46, and protects that convex end surface 26 and the lip 30 from being nicked, scratched or otherwise damaged in such a way that they will not seat properly against concave surface 18 (FIG. 3). The fact that the surface 18 is concave is inherent protection in itself for that surface.

This invention is intended to cover all changes and modifications of the example of the invention herein chosen for purposes of the disclosure which do not constitute departures from the spirit and scope of the invention.

What is claimed is:

1. A fluid line coupling comprising: a first tubular element having a fluid channel and concave spherical seating surface surrounding the end of the fluid channel, the concave seating surface being metal and being in a fixed position on the first element; a second tubular element having a fluid channel therein and a convex spherical seating surface surrounding the end of the fluid channel, the convex surface being metal and being in a fixed position on the second element, the convex surface further being of the same curvature as the concave surface of the first element and being abutted against that concave surface, whereby the spherical seating surfaces have a common center of curvature; a convex spherical bearing surface carried by the second tubular element in a fixed position thereon, the bearing surface away from the convex seating surface, the center of curvature for the bearing surface being offset from the common center of curvature for the seating surfaces; a slip ring surrounding the second element and having a beveled surface against the spherical bearing surface on the second element; and clamping means containing the slip ring and being engaged with the first tubular element for applying an axially directed force to the slip ring to urge the slip ring against the bearing surface and thereby force the convex and concave seating surfaces tightly together, the clamping means loosely receiving the slip ring in the radial direction so that the slip ring may slide laterally within the clamping means and is located in the radial direction by the convex bearing surface.

2. A coupling according to claim 1 wherein the clamping means is a nut which threads over the first coupling element.

3. A coupling according to claim 1 wherein the convex bearing surface is on a bearing ring which is fitted snugly around the second coupling element.

4. A coupling according to claim 2 wherein the beveled surface on the slip ring is a frusto-conical surface which contacts the convex bearing surface and is disposed at an angle of 45° with respect to the longitudinal axis of the nut.

5. A coupling according to claim 2 wherein ring means embraces the second coupling element for limiting the distance the nut may be moved axially away from the convex seating surface; and wherein the nut projects beyond the convex end surface of the second tubular element even when the coupling elements are separated and the nut is against the ring means, whereby the nut protects the convex end surface.

6. A coupling according to claim 2 wherein the second coupling element has a reduced intermediate portion; wherein the nut has an inwardly directed flange which projects into the reduced intermediate portion, the flange being against the slip ring for urging the slip ring against the bearing surface as the nut is tightened.

7. A coupling according to claim 6 wherein the reduced intermediate portion of the second coupling element receives a ring which projects radially outwardly beyond the inner diameter of the nut and prevents the nut from moving off of the second tubular element.

8. A coupling according to claim 1 wherein the second coupling element has a tapered end face which is located radially inwardly from and formed integral with the convex seating surface; and wherein the second element is undercut behind the tapered end face to provide a lip, the inner margin of which engages the concave seating surface on the first element.

9. A fluid line coupling comprising: a first tubular element having a fluid channel and a spherical concave seating surface surrounding the end of the fluid channel and being in a fixed position on the first element, the first element also having threads thereon; a second tubular element having a fluid channel therein and a spherical convex seating surface surrounding the end of its fluid channel and being in a fixed position on the second element, the convex seating surface of the second element being against the concave seating surface of the first element and conforming to the curvature thereof so that the concave and convex seating surfaces have a common center of curvature, the second element further having a beveled bearing surface fixed in position thereon and facing away from the convex seating surface, the beveled bearing surface being axially located between the convex seating surface and the center of curvature for that surface; a nut engaged with the threads of the first element and encircling the second element, the nut having inwardly directed abutment surfaces spaced axially from the beveled bearing surface; and a slip ring against the flat abutment surface of the nut and having a beveled bearing surface located against the beveled bearing surface of the second element, the slip ring being loosely confined in the radial direction by the nut so that it is located in the radial direction by the beveled surface on the second element, whereby when the nut is tightened down over the first element, the slip ring is forced tightly against the beveled bearing surface on the second element and the spherical seating surfaces of the first and second elements are compressed tightly together, at least one of the beveled bearing surfaces being spherical.

10. A fluid coupling according to claim 9 wherein the second element is further provided with a frusto conical tapered face which is located inwardly from and formed integral with the convex seating surface and is presented opposite the concave face of the second element, the second element being undercut behind the tapered face to provide a lip on the second element, the inner margin of the lip engaging the concave seating surface of the first element.

11. A fluid coupling according to claim 9 wherein the beveled bearing surface on the second tubular element is spherical and convex, and the beveled bearing surface on the slip ring is frusto-conical.

* * * * *